(12) United States Patent
Matsuoka et al.

(10) Patent No.: US 9,091,453 B2
(45) Date of Patent: Jul. 28, 2015

(54) ENCLOSURE COOLING USING EARLY COMPRESSOR TURN-OFF WITH EXTENDED FAN OPERATION

(75) Inventors: Yoky Matsuoka, Palo Alto, CA (US);
Mark D. Stefanski, Palo Alto, CA (US);
David Sloo, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 559 days.

(21) Appl. No.: 13/434,573

(22) Filed: Mar. 29, 2012

(65) Prior Publication Data

US 2013/0255297 A1    Oct. 3, 2013

(51) Int. Cl.
*F24F 11/00* (2006.01)

(52) U.S. Cl.
CPC ....... *F24F 11/006* (2013.01); *F24F 2011/0064* (2013.01)

(58) Field of Classification Search
CPC .............. F24F 11/0008; F24F 11/0012; F24F 11/0015; F24F 2011/0012; F24F 2011/0015; F25B 2600/01; F25B 2600/112; F25B 2700/02; F25B 2700/173
USPC .............. 62/157, 176.1, 176.6, 180, 186, 231
See application file for complete search history.

(56) References Cited

U.S. PATENT DOCUMENTS

| | | | |
|---|---|---|---|
| 3,991,357 A | 11/1976 | Kaminski | |
| 4,223,831 A | 9/1980 | Szarka | |
| 4,335,847 A | 6/1982 | Levine | |
| 4,408,711 A | 10/1983 | Levine | |
| 4,615,380 A | 10/1986 | Beckey | |
| 4,646,964 A | 3/1987 | Parker et al. | |
| 4,656,835 A | 4/1987 | Kidder et al. | |
| 4,657,179 A | 4/1987 | Aggers et al. | |
| 4,674,027 A | 6/1987 | Beckey | |
| 4,685,614 A | 8/1987 | Levine | |
| 4,742,475 A | 5/1988 | Kaiser et al. | |

(Continued)

FOREIGN PATENT DOCUMENTS

| | | |
|---|---|---|
| CA | 2202008 | 2/2000 |
| EP | 196069 | 12/1991 |

(Continued)

OTHER PUBLICATIONS

Aprilaire Electronic Thermostats Model 8355 User's Manual, Research Products Corporation, Dec. 2000, 16 pages.

(Continued)

*Primary Examiner* — Marc Norman
(74) *Attorney, Agent, or Firm* — Kilpatrick Townsend & Stockton LLP

(57) ABSTRACT

Systems and methods are described for controlling fan-only cooling duration following normal air conditioning operation. Following normal AC cooling, economical fan cooling is used. The duration of the fan cooling period is adjusted based on temperature measurements made during the previous cooling cycle that ended with fan cooling. An expected temperature drop to be provided by fan cooling as well as an expected time to achieve that drop is calculated based on prior measurements. The expected values are then used improve fan cooling for subsequent cooling cycles. In some cases, fan cooling is not initiated unless: (1) a time limit has an elapsed, such that sufficient condensation is allowed to form on the evaporator coil during the first phase, and (2) indoor relative humidity is below a predetermined threshold.

19 Claims, 9 Drawing Sheets

(56) References Cited

U.S. PATENT DOCUMENTS

| | | |
|---|---|---|
| 4,751,961 A | 6/1988 | Levine et al. |
| 4,897,798 A | 1/1990 | Cler |
| 4,948,040 A | 8/1990 | Kobayashi et al. |
| 5,088,645 A | 2/1992 | Bell |
| 5,211,332 A | 5/1993 | Adams |
| 5,240,178 A | 8/1993 | Dewolf et al. |
| 5,244,146 A | 9/1993 | Jefferson et al. |
| 5,348,078 A | 9/1994 | Dushane et al. |
| 5,381,950 A | 1/1995 | Aldridge |
| 5,395,042 A | 3/1995 | Riley et al. |
| 5,476,221 A | 12/1995 | Seymour |
| 5,499,196 A | 3/1996 | Pacheco |
| 5,533,668 A | 7/1996 | Erikson |
| 5,544,036 A | 8/1996 | Brown, Jr. et al. |
| 5,555,927 A | 9/1996 | Shah |
| 5,595,342 A | 1/1997 | McNair et al. |
| 5,611,484 A | 3/1997 | Uhrich |
| 5,635,896 A | 6/1997 | Tinsley et al. |
| 5,644,173 A | 7/1997 | Elliason et al. |
| 5,761,083 A | 6/1998 | Brown, Jr. et al. |
| 5,802,467 A | 9/1998 | Salazar et al. |
| 5,808,294 A | 9/1998 | Neumann |
| 5,839,654 A | 11/1998 | Weber |
| 5,902,183 A | 5/1999 | D'Souza |
| 5,909,378 A | 6/1999 | De Milleville |
| 5,918,474 A | 7/1999 | Khanpara et al. |
| 5,926,776 A | 7/1999 | Glorioso et al. |
| 5,977,964 A | 11/1999 | Williams et al. |
| 6,062,482 A | 5/2000 | Gauthier et al. |
| 6,066,843 A | 5/2000 | Scheremeta |
| 6,095,427 A | 8/2000 | Hoium et al. |
| 6,098,893 A | 8/2000 | Berglund et al. |
| 6,116,512 A | 9/2000 | Dushane et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,370,894 B1 | 4/2002 | Thompson et al. |
| 6,385,510 B1 | 5/2002 | Hoog et al. |
| 6,415,205 B1 | 7/2002 | Myron et al. |
| 6,453,687 B2 | 9/2002 | Sharood et al. |
| 6,478,233 B1 | 11/2002 | Shah |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,645,066 B2 | 11/2003 | Gutta et al. |
| 6,769,482 B2 | 8/2004 | Wagner et al. |
| 6,798,341 B1 | 9/2004 | Eckel et al. |
| 6,975,958 B2 | 12/2005 | Bohrer et al. |
| 6,983,889 B2 | 1/2006 | Alles |
| 6,990,821 B2 | 1/2006 | Singh et al. |
| 6,997,390 B2 | 2/2006 | Alles |
| 7,024,336 B2 | 4/2006 | Salsbury et al. |
| 7,135,965 B2 | 11/2006 | Chapman, Jr. et al. |
| 7,149,729 B2 | 12/2006 | Kaasten et al. |
| 7,156,316 B2 | 1/2007 | Kates |
| 7,168,627 B2 | 1/2007 | Kates |
| 7,188,482 B2 | 3/2007 | Sadegh et al. |
| 7,200,467 B2 | 4/2007 | Schanin et al. |
| 7,210,302 B2 | 5/2007 | Konopa |
| 7,289,887 B2 | 10/2007 | Rodgers |
| 7,360,370 B2 | 4/2008 | Shah et al. |
| 7,379,791 B2 | 5/2008 | Tamarkin et al. |
| RE40,437 E | 7/2008 | Rosen |
| 7,469,550 B2 | 12/2008 | Chapman, Jr. et al. |
| 7,537,171 B2 | 5/2009 | Mueller et al. |
| 7,558,648 B2 | 7/2009 | Hoglund et al. |
| 7,605,714 B2 | 10/2009 | Thompson et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,832,465 B2 | 11/2010 | Zou et al. |
| 7,837,128 B2 | 11/2010 | Helt et al. |
| 7,847,681 B2 | 12/2010 | Singhal et al. |
| 7,848,900 B2 | 12/2010 | Steinberg et al. |
| 7,854,389 B2 | 12/2010 | Ahmed |
| 7,904,830 B2 | 3/2011 | Hoglund et al. |
| 8,010,237 B2 | 8/2011 | Cheung et al. |
| 8,019,567 B2 | 9/2011 | Steinberg et al. |
| 8,034,170 B2 | 10/2011 | Kates |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,180,492 B2 | 5/2012 | Steinberg |
| 8,219,249 B2 * | 7/2012 | Harrod et al. ............ 62/186 |
| 2002/0144510 A1 * | 10/2002 | Park et al. ............ 62/186 |
| 2004/0249479 A1 | 12/2004 | Shorrock |
| 2005/0043907 A1 | 2/2005 | Eckel et al. |
| 2005/0090915 A1 | 4/2005 | Geiwitz |
| 2005/0128067 A1 | 6/2005 | Zakrewski |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0270151 A1 | 12/2005 | Winick |
| 2005/0280421 A1 | 12/2005 | Yomoda et al. |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0114295 A1 | 5/2007 | Jenkins |
| 2007/0115902 A1 | 5/2007 | Shamoon et al. |
| 2007/0131787 A1 | 6/2007 | Rossi et al. |
| 2007/0228183 A1 | 10/2007 | Kennedy et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0128523 A1 | 6/2008 | Hoglund et al. |
| 2008/0161977 A1 | 7/2008 | Takach et al. |
| 2008/0185450 A1 | 8/2008 | Kwon et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0045263 A1 | 2/2009 | Mueller et al. |
| 2009/0171862 A1 | 7/2009 | Harrod et al. |
| 2009/0236433 A1 | 9/2009 | Mueller et al. |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2009/0327354 A1 | 12/2009 | Resnick et al. |
| 2010/0000239 A1 | 1/2010 | Lifson et al. |
| 2010/0006660 A1 | 1/2010 | Leen et al. |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054699 A1 | 3/2011 | Imes et al. |
| 2011/0077896 A1 | 3/2011 | Steinberg et al. |
| 2011/0151837 A1 | 6/2011 | Winbush, III |

(56) References Cited

U.S. PATENT DOCUMENTS

| | | | |
|---|---|---|---|
| 2011/0160913 | A1 | 6/2011 | Parker et al. |
| 2011/0185895 | A1 | 8/2011 | Freen |
| 2011/0253796 | A1 | 10/2011 | Posa et al. |
| 2011/0307103 | A1 | 12/2011 | Cheung et al. |
| 2012/0017611 | A1 | 1/2012 | Coffel et al. |
| 2012/0065935 | A1 | 3/2012 | Steinberg et al. |
| 2012/0085831 | A1 | 4/2012 | Kopp |
| 2012/0158350 | A1 | 6/2012 | Steinberg et al. |
| 2012/0221151 | A1 | 8/2012 | Steinberg |

FOREIGN PATENT DOCUMENTS

| | | |
|---|---|---|
| EP | 1275037 | 2/2006 |
| JP | 59106311 | 6/1984 |
| JP | 01252850 | 10/1989 |
| JP | 10023565 | 1/1998 |
| WO | 2013/149160 A1 | 10/2013 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc. Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Deleeuw, "Ecobee WiFi Enabled Smart Thermostat Part 2: The Features Review", Retrieved from <URL:http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to its Inhabitants", AAAI Technical Report SS-98-02, 1998, pp. 110-114.
International Patent Application No. PCT/US2013/034630, International Search Report and Written Opinion, mailed Jun. 18, 2013, 18 pages.
International Preliminary Report on Patentability for PCT/US2013/034630 issued on Oct. 1, 2014, 10 pages.

\* cited by examiner

ENCLOSURE COOLING USING EARLY COMPRESSOR TURN-OFF WITH EXTENDED FAN OPERATION

FIELD

This patent specification relates to systems, methods, and related computer program products for the monitoring and control of energy-consuming systems or other resource-consuming systems. More particularly, this patent specification relates to systems and methods for updating climate control algorithms.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

In common air conditioning operation, a compressor compresses a refrigerant gas, which condenses in a condenser coil. The refrigerant passes through an expansion valve and into an evaporator coil that is cooled by the expanding and evaporating refrigerant. A fan is used to pass air over the cooled evaporator coil and move the cooled air into the indoor environment. As the air conditioning system operates, depending on the dew point of the air in the ducts and the temperature of the coil, condensation tends to form on the evaporator coil. After the air conditioning system ceases in normal operation the compressor and the fan are both turned off. However, if sufficient condensation has collected on the evaporator coil, additional cooling can be provided by continuing to operate the fan without the compressor. Of the two main energy-consuming parts of the system, the compressor generally consumes energy at a far greater rate than the fan. Accordingly, in some situations overall cooling costs and energy can be lowered by operating fan-only cooling for some time after each conventional air conditioning cycle.

SUMMARY

Provided according to one or more embodiments is a method for cooling an enclosure. The method includes initiating a first phase of a cooling cycle using an air conditioning system having a compressor, an evaporator coil and a fan adapted to pass air over the evaporator coil. In this first phase the compressor and the fan are both activated. Subsequent to the first phase, a second phase is initiated in which the fan is activated but the compressor is not activated. One or more parameters such as temperature are measured during the second phase. The duration of the second phase of a subsequent cooling cycle is altered or adjusted based on the measurements during the first cooling cycle. According to some embodiments a thermostat is used to initiate the first and second phases as well as make adjustments to the duration of the subsequent second phase.

According to some embodiments, the duration of the second phase of the subsequent cooling cycle depends on an expected temperature drop that is based on the temperature drop during the second phase of the first cooling cycle. According to some embodiments, the second phase is initiated when the expected temperature drop is expected to cool the enclosure to about the lower maintenance band temperature. According to some embodiments, the duration of the second phase also depends on an expected amount of time for the expected temperature drop.

According to some embodiments, the initiation of the second phase does not occur unless a predetermined time limit has elapsed, such that sufficient condensation is allowed to form on the evaporator coil during the first phase. According to some embodiments the initiation of the second phase does not occur unless relative humidity within the enclosure is below a predetermined threshold, which in some examples is set between 45 and 60 percent relative humidity.

According to some embodiments the thermostat includes high-power consuming circuitry adapted to perform a plurality of high-power consuming activities, and low-power consuming circuitry adapted to perform a plurality of low-power activities, and the high-power circuitry is allowed to enter an inactive state to conserve power within the thermostat while the lower power circuitry measures and records one or more parameters.

According to some embodiments, a method for cooling an enclosure is described which includes: initiating a first phase of a cooling cycle using both the compressor and the fan of the air conditioning system; measuring relative humidity within the enclosure; and subsequently, when the measured relative humidity is below a threshold level, initiating a second phase of the cooling cycle wherein the fan is activated and the compressor is not activated. According to some embodiments the threshold is predetermined and set between 45 and 60 percent relative humidity.

According to some embodiments, a method for controlling cooling in an enclosure using a thermostat is described. The method includes using the thermostat to initiate a first phase of a cooling cycle using both the compressor and the fan of the air conditioning system; automatically detecting if a fan control wire is connected to the thermostat; and subsequently, in cases where a connection of a fan control wire to the thermostat is detected, initiating a second phase of the cooling cycle which uses the fan but not the compressor.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
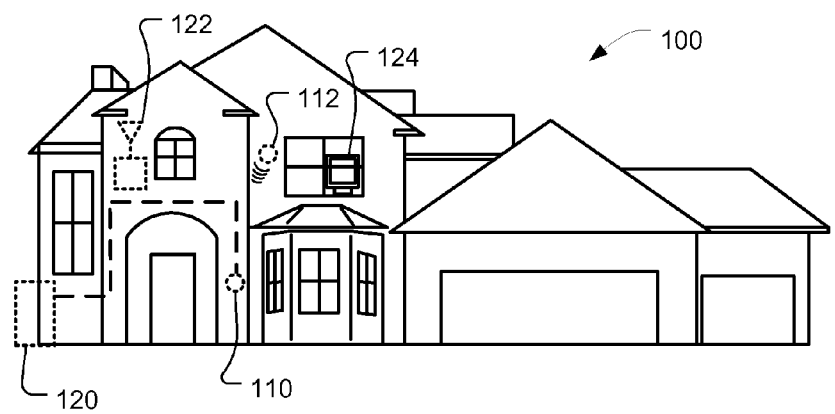
FIG. 1 is a diagram of an enclosure in which environmental conditions are controlled, according to some embodiments.

The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; and U.S. Prov. Ser. No. 61/627,996 filed Oct. 21, 2011. PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 filed Jan. 2, 2012; PCT/US12/00008 filed Jan. 3, 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; and PCT/US12/30084 filed Mar. 22, 2012. Each of the above-referenced patent applications is incorporated by reference herein. The above-referenced patent applications are collectively referenced hereinbelow as "the commonly assigned incorporated applications."

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 is a diagram of an enclosure in which environmental conditions are controlled, according to some embodiments. Enclosure 100 is, in this example, a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Other embodiments may instead use multiple discrete switches, routers and other devices (not shown) to perform networking functions equivalent to or in addition to those provided by integrated router 122.

Integrated router 122 further provides network devices access to a public network, such as the Internet, provided enclosure 100 has a connection to the public network generally through a cable-modem, DSL modem and a service provider of the Internet or other public network. The Internet and other public networks are sometimes referred to as a Wide-Area Network or WAN. In one embodiment, integrated router 122 may direct communications to other devices on these networks using a network protocol such as TCP/IP. If the communications are directed to a device or service outside the private network, integrated router 122 may route the communications outside the private network to the public network such as the Internet.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

In accordance with some embodiments, a computer device 124 in enclosure 100 may remotely control thermostat 110 by accessing a thermostat management account through a thermostat management system (not shown in FIG. 1) located on a public network such as the Internet. The thermostat management system passes control information over the network back to thermostat 110 provided the thermostat 110 is also associated or paired to the thermostat management account on the thermostat management system. Data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network and both the thermostat management system and thermostat management account. Further details on accessing the public network, such as the Internet, and a thermostat like thermostat 110 in accordance with embodiments of the present invention is described in further detail later herein.

Figure 2:
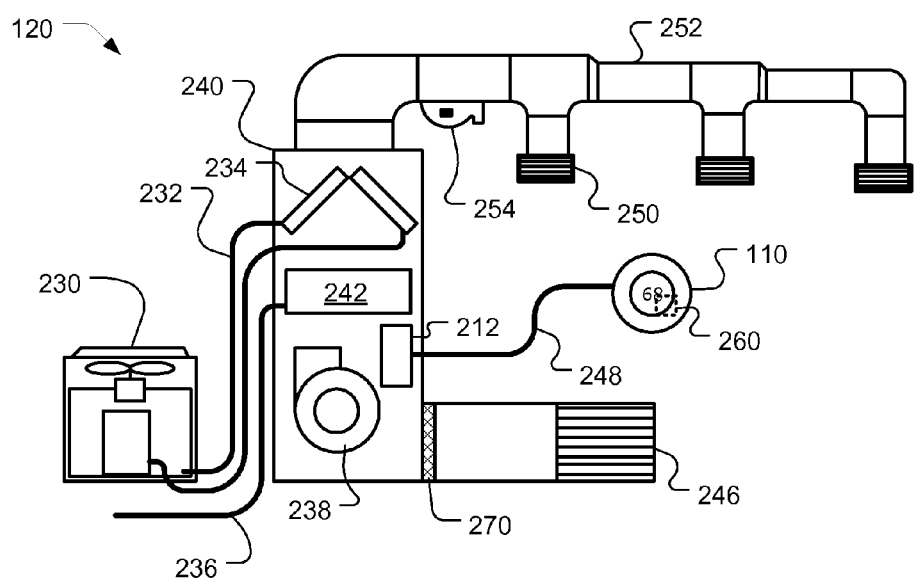
FIG. 2 is a diagram of an HVAC system, according to some embodiments.

FIG. 2 is a schematic diagram of an HVAC system, according to some embodiments. HVAC system 120 provides heating, cooling, ventilation, and/or air handling for the enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils and then through an expansion valve. The gas then goes through line 232 to the cooling coils or evaporator coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
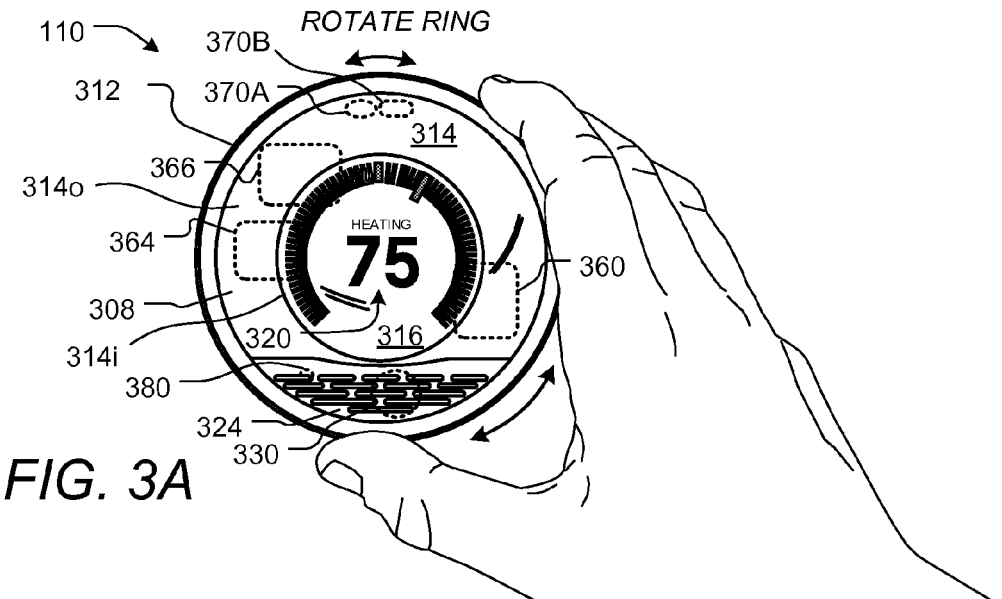
FIGS. 3A-3B illustrate a thermostat having a user-friendly interface, according to some embodiments.
Figure 3B:
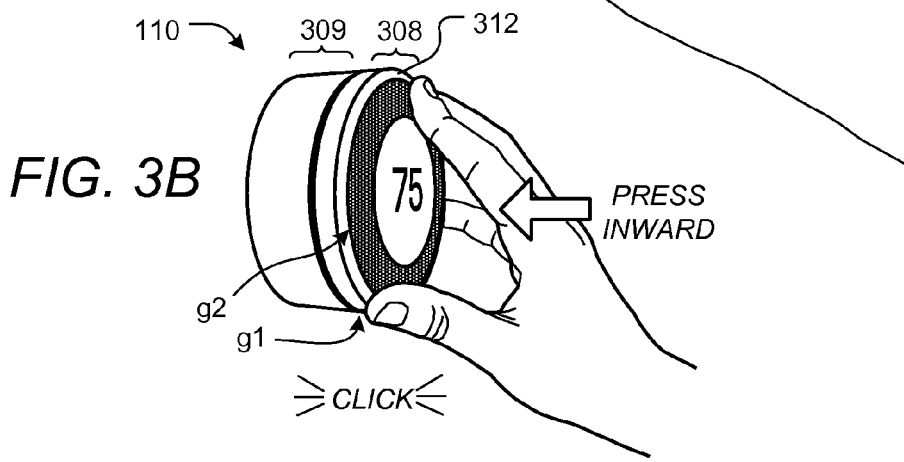

FIGS. 3A-3B illustrate a thermostat having a user-friendly interface, according to some embodiments. Unlike many prior art thermostats, thermostat 110 preferably has a sleek, simple, uncluttered and elegant design that does not detract from home decoration, and indeed can serve as a visually pleasing centerpiece for the immediate location in which it is installed. Moreover, user interaction with thermostat 110 is facilitated and greatly enhanced over known conventional thermostats by the design of thermostat 110. The thermostat 110 includes control circuitry and is electrically connected to an HVAC system, such as is shown in FIGS. 1 and 2. Thermostat 110 is wall mounted, is circular in shape, and has an outer rotatable ring 312 for receiving user input. Thermostat 110 is circular in shape in that it appears as a generally disk-like circular object when mounted on the wall. Thermostat 110 has a large front face lying inside the outer ring 312. According to some embodiments, thermostat 110 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 110 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314o and a central portion 314i. According to some embodiments, the cover 314 is painted or smoked around the outer portion 314o, but leaves the central portion 314i visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has a number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108, supra. The thermostat 110 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 110 is about 80 mm, the diameter of the electronic display 316 is about 45 mm. According to some embodiments an LED indicator 380 is positioned beneath portion 324 to act as a low-power-consuming indicator of certain status conditions. For example, the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 110 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 110 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 110 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus his or her attention on the electronic display throughout the input process, right in the middle of where his or her hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 3C:
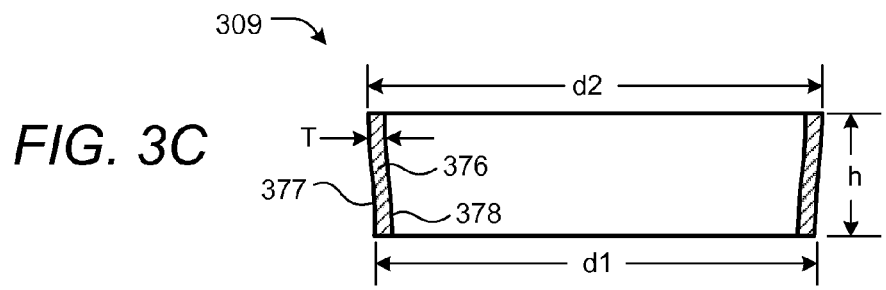
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 110 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 110, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 110 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 110 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463, supra, and in International Patent App. No. PCT/US11/51579, incorporated herein by reference. According to some embodiments, the wireless communications system 366 is used to communicate with devices such as personal computers and/or other thermostats or HVAC system components, which can be peer-to-peer communications, communications through one or more servers located on a private network, and/or communications through a cloud-based service.

Figure 4:
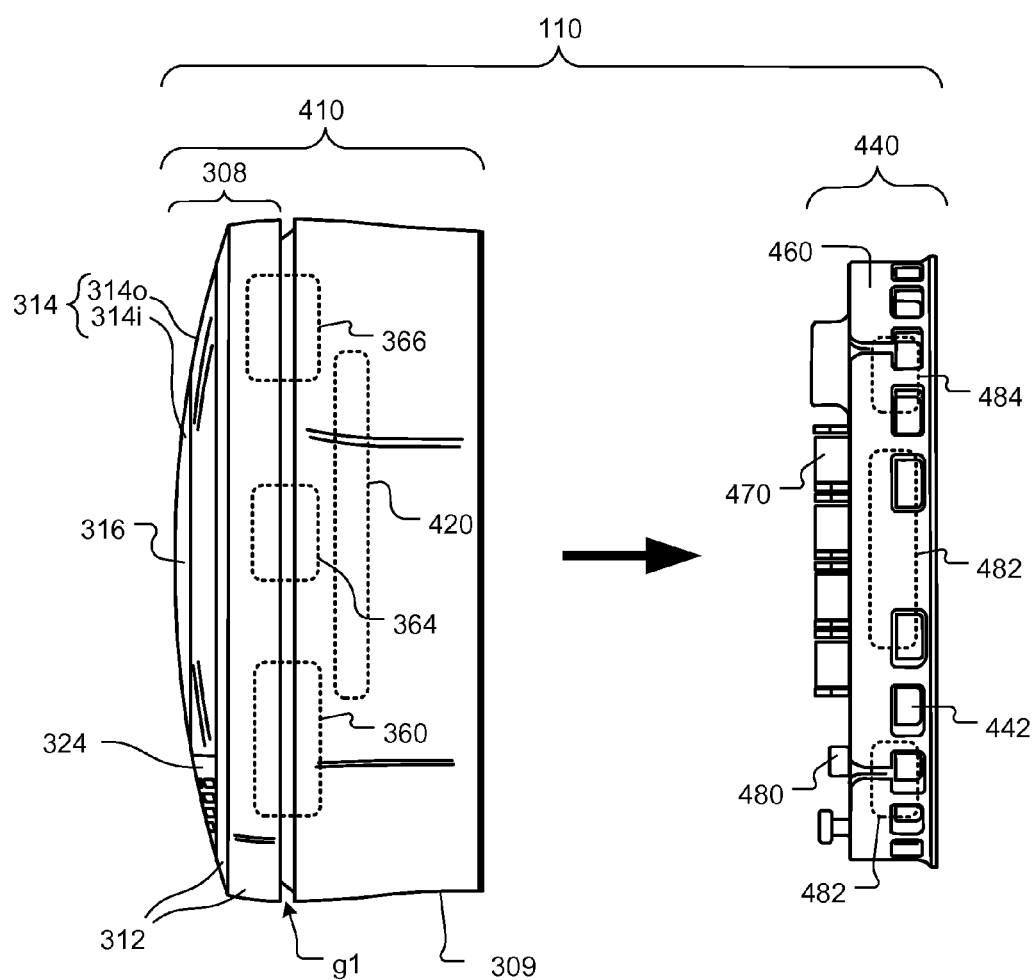
FIG. 4 illustrates a thermostat having a head unit and a backplate (or wall dock) for ease of installation, configuration and upgrading, according to some embodiments.

FIG. 4 illustrates a side view of the thermostat 110 including a head unit 410 and a backplate (or wall dock) 440 thereof for ease of installation, configuration and upgrading, according to some embodiments. As is described hereinabove, thermostat 110 is wall mounted, is circular in shape, and has an outer rotatable ring 312 for receiving user input. Head unit 410 includes the outer cap 308 that includes the cover 314 and electronic display 316. Head unit 410 of round thermostat 110 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from a/the backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 420 is a single cell lithium-ion or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available from the HVAC system circuitry. For the operation of fan cooling, it is useful to detect the presence of a fan motor control wire (often known as a "G" wire). According to some embodiments, wire connectors 470 are used to detect the physical and/or electrical presence of an inserted wire. Additionally, internal circuitry in thermostat 110 can be used in combination with or instead of connectors 470 to detect the presence of a wire. For further details of connectors 470 and wire detection, see co-pending patent application U.S. Ser. No. 13/034,666, which is incorporated by reference herein.

Figure 5:
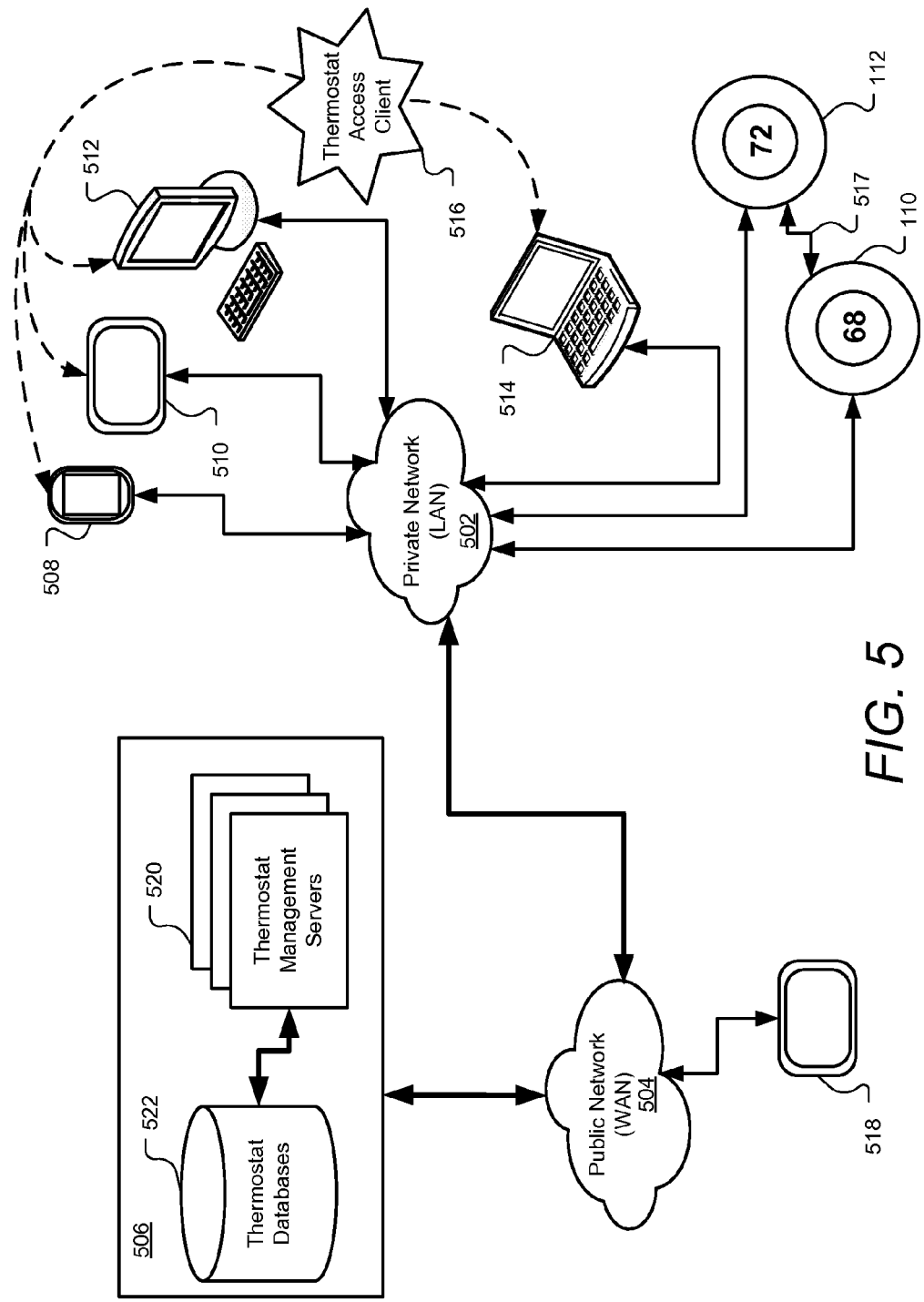
FIG. 5 illustrates thermostats and computers on a private network connected to a cloud-based thermostat management system designed in accordance with some embodiments.

FIG. 5 illustrates thermostats and computers on a private network 502 connected to a cloud-based thermostat management system 506 designed in accordance with some embodiments. In one embodiment, private network 502 is designed to provide network connectivity primarily within and near an enclosure, such as enclosure 100 in FIG. 1. Private network 502 additionally provides network connectivity for various devices such a smartphone 508, tablet 510, computer 512, and laptop 514, as well as the thermostat 110 and remote thermostat 112. A router (not shown) in private network 502, such as integrated router 122 in FIG. 1, may provide wired and wireless connectivity for these devices using a network protocol such as TCP/IP. Preferably, thermostat 110 and remote thermostat 112 are connected wirelessly to private network 502, for at least the reason that wired connections to the locations of the thermostats may not be available, or it may be undesirable to incorporate such physical connections in either thermostat 110 or remote thermostat 112. For some embodiments, it is also possible for thermostat 110 and remote thermostat 112 to communicate directly with each other and other devices wirelessly using an ad hoc network 517 preferably setup directly between the devices and bypassing private network 502.

The embodiments described herein are advantageously configured to be compatible with a large variety of conventional integrated routers that service a large population of homes and businesses. Thus, by way of example only and not by way of limitation, the router (not shown) that services the private network 502 of FIG. 5 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router. Without loss of generality, some descriptions further hereinbelow will refer to an exemplary scenario in which the thermostats 110/112 are used in a home environment. However, it is to be appreciated that the described embodiments are not so limited, and are applicable to use of such thermostat(s) in any of a variety of enclosures including residential homes, business, vacation homes, hotels, hotel rooms, industrial facilities, and generally anywhere there is an HVAC system to be controlled.

Thermostat access client 516 is a client application designed in accordance with aspects of the present invention to access the thermostat management system 506 over public network 504. The term "thermostat management system" can be interchangeably referenced as a "cloud-based management server" for the thermostats, or more simply "cloud server", in various descriptions hereinabove and hereinbelow. Because thermostat access client 516 is designed to execute on different devices, multiple client applications may be developed using different technologies based on the requirements of the underlying device platform or operating system. For some embodiments, thermostat access client 516 is implemented such that end users operate their Internet-accessible devices (e.g., desktop computers, notebook computers, Internet-enabled mobile devices, cellphones having rendering engines, or the like) that are capable of accessing and interacting with the thermostat management system 506. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the thermostat management system 506, the thermostat access client 514, and other devices for some embodiments, it is set forth by way of example and not by way of limitation, in that any other suitable protocol, such as UDP over IP in particular, may be used without departing from the scope of the present teachings.

In yet another embodiment, thermostat access client 516 may be a stand-alone application or "app" designed to be downloaded and run on a specific device such as smartphone 508 or a tablet 510 device running the Apple iOS operating system, Android operating system, or others. Developers create these stand-alone applications using a set of application programming interfaces (APIs) and libraries provided by the device manufacturer packaged in software development toolkit or SDK. Once completed, the "app" is made available for download to the respective device through an application store or "app" store curated by the app store owners to promote quality, usability and customer satisfaction.

In one embodiment, thermostat management system 506 illustrated in FIG. 5 may be accessed over public network 504 by computer devices on private network 502 running thermostat access client 516. Thermostat access client 516 accesses a thermostat management account (not illustrated) provisioned by thermostat management system 506, on behalf of the computer devices, in order to access or control thermostat 110 or remote thermostat 112. In addition, a computer device on private network 502 such as computer 512 may use the thermostat access client 516 and thermostat management account to gather data from thermostat 110 and remote thermostat 112.

Thermostat 110 and remote thermostat 112 may be accessed remotely from numerous different locations on the private network 502 or public network 504. As will be described in further detail hereinbelow, upon installation a thermostat such as thermostat 110 first registers with the thermostat management system 506 and then requests the thermostat management system create a pairing between the thermostat and a corresponding thermostat management account. Thereafter, a device such as a tablet 518 may be connected to public network 504 directly or through a series of other private networks (not shown) yet still access these thermostats, while outside the private network where they are located, by way of thermostat management system 506. In one embodiment, a tablet 518 running the Apple iOS operating system may remotely access these thermostats through the thermostat management system 506 and thermostat management account using an iOS "app" version of thermostat access client 516. Pairing thermostats with the thermostat management account allows tablet 518 and other computer devices to remotely control, gather data, and generally interact with thermostats such as thermostat 110 and remote thermostat 112.

In one embodiment, thermostat management system 506 distributes the task of communication and control with the thermostats to one or more thermostat management servers 520. These thermostat management servers 520 may coordinate communication, manage access, process data and analyze results using data produced by thermostats such as thermostat 110 and remote thermostat 112. Intermediate and final results from computations on these servers 520, as well as raw data, may be stored temporarily or archived on thermostat databases 522 for future reference and use. Thermostat management servers 520 may also send a portion of the data along with control information, and more generally any of a variety of different kinds of information, back to thermostat 110 and remote thermostat 112. Results from the thermostat management servers 520 may also be stored in one or more thermostat databases 522 for subsequent access by a device such as tablet 518 running thermostat access client 516.

These thermostat management servers 520 each may perform one or several discrete functions, may serve as redundant fail-over servers for these different discrete functions or may share performance of certain discrete functions in tandem or in a cluster as well as other combinations performing more complex operations in parallel or distributed over one or more clusters of computers. In some embodiments, one of the thermostat management servers 520 may correspond directly to a physical computer or computing device while in other embodiments, the thermostat management servers 520 may be virtualized servers running on one or more physical computers under the control of a virtual machine computing environment such as provided by VMWARE of Palo Alto, Calif. or any other virtual machine provider. In yet another embodiment, the thermostat management servers 520 and thermostat databases 522 are provisioned from a "cloud" computing and storage environment such as the Elastic Compute Cloud or EC2 offering from Amazon.com of Seattle, Wash. In an EC2 solution, for example, the thermostat management servers 520 may be allocated according to processor cycles and storage requirements rather than according to a number of computers, either real or virtual, thought to be required for the task at hand.

It has been found that of the two main energy-consuming parts of the air conditioning system, the compressor (e.g. compressor 230) and the fan (e.g. blower fan 238), the compressor generally consumes energy at a far greater rate than the fan. In many cases the compressor consumes energy at rate of several kilowatts or greater, while the fan consumes energy at a rate of much less than one kilowatt. A differential of about one order of magnitude is not uncommon. Accordingly, substantial savings of cost and energy can be provided by operating fan cooling following normal air conditioner operation. In the case of fan cooling, the cooling comes from evaporating the condensate off of the evaporator coil, which introduces water vapor into the indoor air, which in turn increases the apparent temperature of the enclosure. Note that the cooling effect from fan cooling is based on evaporative cooling in contrast to some techniques that simply flush the lingering cool air out of the ducts. In some cases, therefore, fan cooling is less effective or even detrimental to indoor comfort. For example, if insufficient condensation has formed on the evaporator coils then fan cooling is much less effective. Also, when indoor relative humidity is high, such as greater than 50-55%, the indoor comfort level may not be improved through fan cooling. Additionally, it has been found that the effectiveness of fan cooling depends on a number of other environmental factors such as temperature and humidity both indoors and outdoors as well as the particular designs of the air conditioning system and the structure being cooled.

Thus it has been found that it is useful to adapt fan cooling to the particular situation. According to some embodiments, it has been found that estimates of fan cooling effectiveness can be obtained by analyzing the system behavior during previous cooling cycles. In particular, according to some embodiments, an expected temperature drop due to fan cooling and an expected amount of time to achieve that drop are estimated from measurements of one or more prior cooling cycles.

Figure 6:
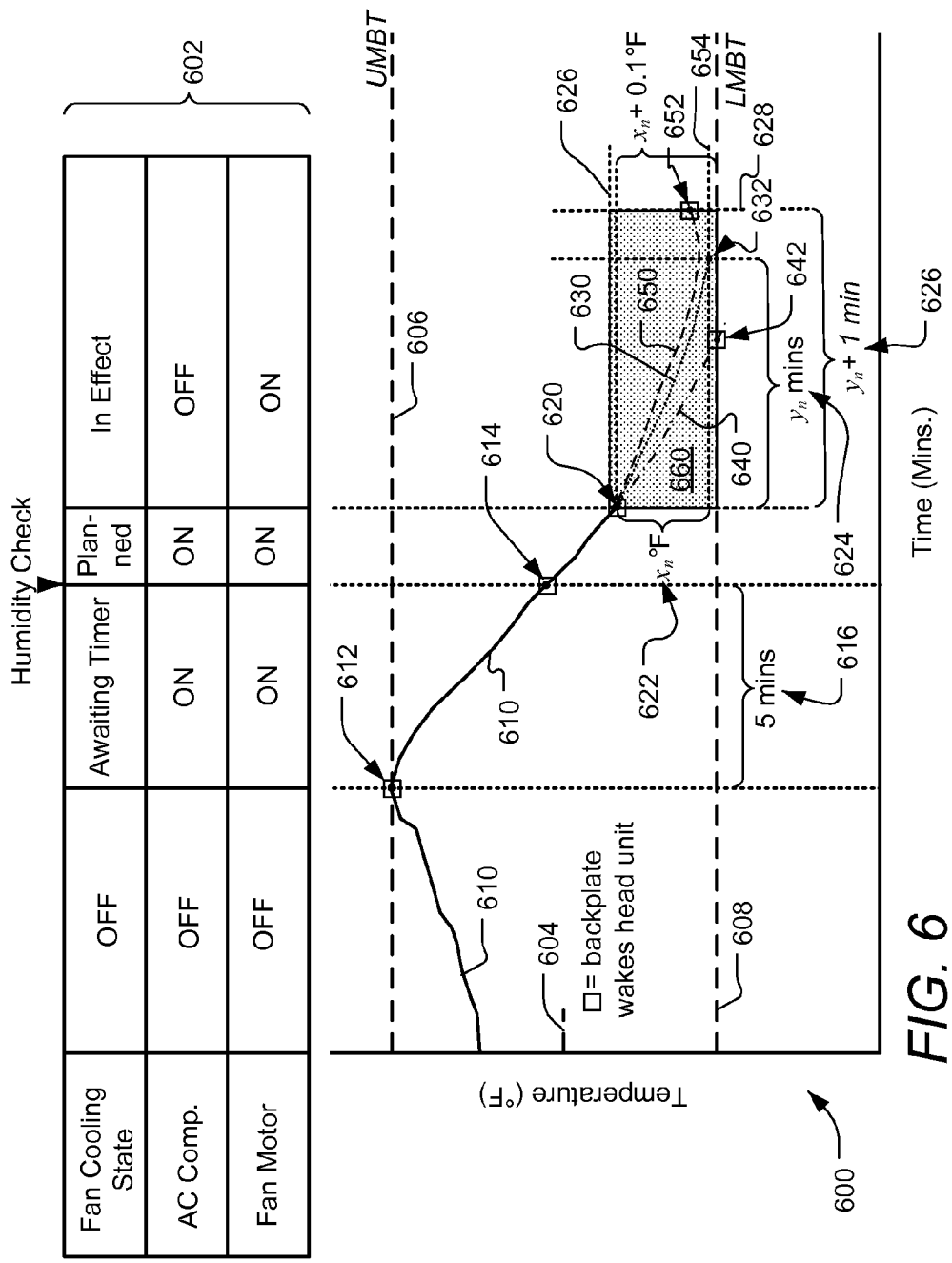
FIG. 6 is a diagram illustrating the operation of adaptable fan cooling, according to some embodiments.

FIG. 6 is a diagram illustrating the operation of adaptable fan cooling, according to some embodiments. The plot area 600 shows measured current temperature plot 610 as measured by the thermostat (e.g. thermostat 110 as describe herein). The upper table area 602 shows the fan cooling state, AC compressor status and fan motor status during various phases of the depicted fan cooling operation. The thermostat set point 604 is shown, along with an upper maintenance band temperature (UMBT) 606 and a lower maintenance band temperature (LMBT) 608. The thermostat is programmed to maintain the temperature between the UMBT and LMBT. According to some embodiments the set point 604 is half-way in between the UMBT 606 and LMBT 608, and according to some embodiments the UMBT 606 is 1° F. above the set point 604 and the LMBT 608 is 1° F. below the set point 604 such that the maintenance band is 2° F. wide. According to other embodiments, other maintenance bands can be used and the set point need not be in the middle of the maintenance band as may be suitable for some applications and control systems. As can be seen, prior to the point 612 the current temperature 610 is below the UMBT 606. The fan cooling state, the AC compressor and the fan motor are all "OFF." Accordingly, due to the outside temperature and/or weather in this example the current temperature is steadily rising prior to point 612.

According to some embodiments, the thermostat 110 includes a head unit (such as head unit 410) and a backplate (such as backplate 440) design wherein the head unit includes high-power consuming circuitry adapted to perform high power activities such as interfacing with a user, wireless communication, and/or processing computations to enable features such as learning and adapting fan control parameters, while the backplate includes lower power consuming circuitry for performing lower power activities such as monitoring and logging sensor data such as temperature and humidity. Further, according to such embodiments, the higher power consuming head unit can temporarily operate in an active or awake state that consumes more power than can be harvested from the HVAC triggering circuitry by drawing power from a power storage device such as a rechargeable battery. The head unit goes "inactive" or into a "sleep" state when not in use so as to conserve battery power. In such embodiments, the backplate under certain circumstances wakes up the sleeping head unit. For further detail of the head unit and backplate operation see International Application No. PCT/US2011/061437. In FIG. 6 the backplate, which is used to monitor and record the current temperature and humidity sensor data, wakes up the head unit under certain conditions marked on the plot with a square symbol. At point 612, the backplate measures the current temperature as being equal (or greater) than the UMBT 606 and therefore wake up the head unit. The head unit turns on HVAC cooling by turning on both the AC compressor and the fan motor, as well as sets the fan cooling state to "awaiting timer."

After point 612, the HVAC cooling using the AC compressor and fan cools the enclosure as can be seen by the steadily decreasing current temperature on plot 610. When the AC compressor is turned on at point 612, condensation begins to collect on the AC evaporator coil. It has been found that if an insufficient amount of condensation has formed on the evaporator coil then fan cooling will be ineffective. Accordingly, according to some embodiments, when the AC compressor first turns on a timer 616 is started. Fan cooling is prevented during the timer period 616 and can only be operated after the timer 616 has expired. It has been found that in many cases a timer period 616 of 5 minutes is suitable for sufficient condensation to form. According to other embodiments, other amounts of time, either fixed or variable can be used, or alternatively other information such as sensor data can be used to ensure sufficient condensation formation for fan cooling. During the period of timer 616, the fan cooling state is "awaiting timer."

After the timer 616 has expired, at point 614, the head unit is again woken up and a check is made on the indoor humidity level. It has been found that if the indoor humidity is too high then fan cooling generally does not increase occupant comfort level since fan cooling will tend to increase humidity so as to adversely affect comfort. According to some embodiments, a humidity sensor is included in the thermostat 110 and a determination is made at point 614 whether to operate fan cooling based at least in part on the humidity. According to some embodiments, a simple humidity threshold is used to determine if fan cooling should be allowed or prevented. It has been found that a threshold of between 45%-60% relatively humidity is suitable for many situations and according to some embodiments a threshold of 45% is used. If the humidity check passes, that is the measured relatively humidity is not above the threshold, then the fan cooling state is changed to "planned" such that fan cooling will be activated if or when the current temperature falls to within a range in which it can be expected that fan cooling can be used to reach the LMBT. According to some embodiments, alternatives to a simple humidity threshold can be used; for example, the check at point 614 can include a combination of humidity and temperature, according to some embodiments. Also note that it is possible for the conventional AC to drive the temperature below the LMBT within 5 minutes (or whatever the timer period is), meaning that fan cooling might not become active even if the humidity is low enough.

Fan cooling is activated when the current temperature falls to within a range in which it can be expected that the LMBT can be reached using fan cooling alone. In FIG. 6 this range 622 is denoted $x_n$° F. where the term $x_n$ denotes the expected amount of temperature drop to be achieved using fan cooling. According to some embodiments, the expected temperature drop $x_n$ is based on data gathered during one or more previous cooling cycles at the enclosure. In FIG. 6, the expected fan cooling temperature drop is plotted by line 630 which reaches the LMBT at point 632. It has been found that the previous cooling cycle generally provides accurate data for the expected temperature drop. A default or initial value for a temperature drop is used, and it has been found that 0.5° F. is a good initial value for many cases. Alternatively, another initial value can be used, such as 25% or 50% of the maintenance band. It has also been found that a small increment, such as 0.1° F., can be added to the expected temperature drop, such that fan cooling is started when the temperature drops to within $x_n$+0.1° F. above the LMBT. The small increment is added to allow fan cooling to be attempted in cases where due to prior cooling cycles the expected fan cooling temperature drop is set to zero. In FIG. 6, point 620 is reached when the current temperature reaches LMBT+$x_n$+0.1° F. At this time, the head unit is woken up by the backplate and fan cooling is started by turning off the AC compressor while leaving the fan motor turned on. According to some embodiments, a maximum fan cooling range can also be implemented. It has been found that a maximum fan cooling range of 1° F. is suitable for many applications. In this case, if the expected temperature drop is 0.95° F. based on a prior cooling cycle, fan cooling will start when the current temperature is within 1° F. of the LMBT, rather than 1.05° F. (0.95+0.1) above the LMBT.

According to some embodiments, during fan cooling the backplate measures the temperature and wakes the head unit to cease fan cooling when either: (a) the temperature rises above or falls below certain thresholds; or (b) the duration of fan cooling exceeds a certain timeout. The zone in which fan cooling may be in effect is denoted by the shaded area 660 in FIG. 6 which is bounded by the upper temperature limit 626, LMBT 608, and an expiry time 628. The upper limit 626 acts to prevent the fan operating when the temperature rises above the temperature at which fan cooling started, indicating that fan cooling is no longer effective for the current cycle. It has been found the upper limit can be set to a small increment above the fan cooling starting temperature (at point 622), such as 0.1° F. Thus the upper limit 626 in this case is equal to LMBT+$x_n$+0.1 (unless $x_n$+0.1>0.9). The lower boundary temperature of zone 660 is simply the LMBT 608. The time limit is based on the expected time (denoted $y_n$) to reach the expected temperature drop $x_n$ (or at point 632). According to some embodiments, $y_n$, the expected time to reach the expected temperature drop $x_n$ from the start of fan cooling is based on data gathered during one or more previous cooling cycles at the enclosure. It has been found that the previous cooling cycle generally provides accurate data for the expected time $y_n$. According to some embodiments an additional buffer is added to the expected time $y_n$ so that fan cooling is maintained if it takes longer than expected to reach the LMBT. In selecting the value for the buffer time or extension time, it should be considered that fan operation is relatively inexpensive, with power consumption well below 1 kilowatt compared to the AC compressor's power consumption of 3-5 kilowatts. Thus, it has been found that the cost of additional fan cooling time is relatively small compared to the potential gain of inexpensive cooling. It has been found that a buffer time of 60 seconds to 2.5 minutes is suitable for many applications, although according to other embodiments other fixed or variable values can be used. Thus, in the embodiment of FIG. 6 the time limit 626 for fan cooling is $y_n$+60 seconds.

FIG. 6 shows two different scenarios for fan cooling. Line 640 shows a case where fan cooling is more effective than the expected cooling line 630, and reaches the LMBT at point 642 before the expected time $y_n$, or according to some embodiments before $y_n$+60 secs. Line 650 shows a case where fan cooling is less effective than the expected cooling line 630 and fails to reach the LMBT before the time limit $y_n$+60 seconds at point 652. Note that in the case of line 650, the temperature reached a minimum and then began to increase before the expiry of the time limit. Other cases are shown in further detail in FIG. 7. By using a zone such as zone 660 for waking up the head unit to cease fan cooling, the head unit does not need to be kept awake during fan cooling such that power in thermostat 110 can be conserved.

Figure 7:
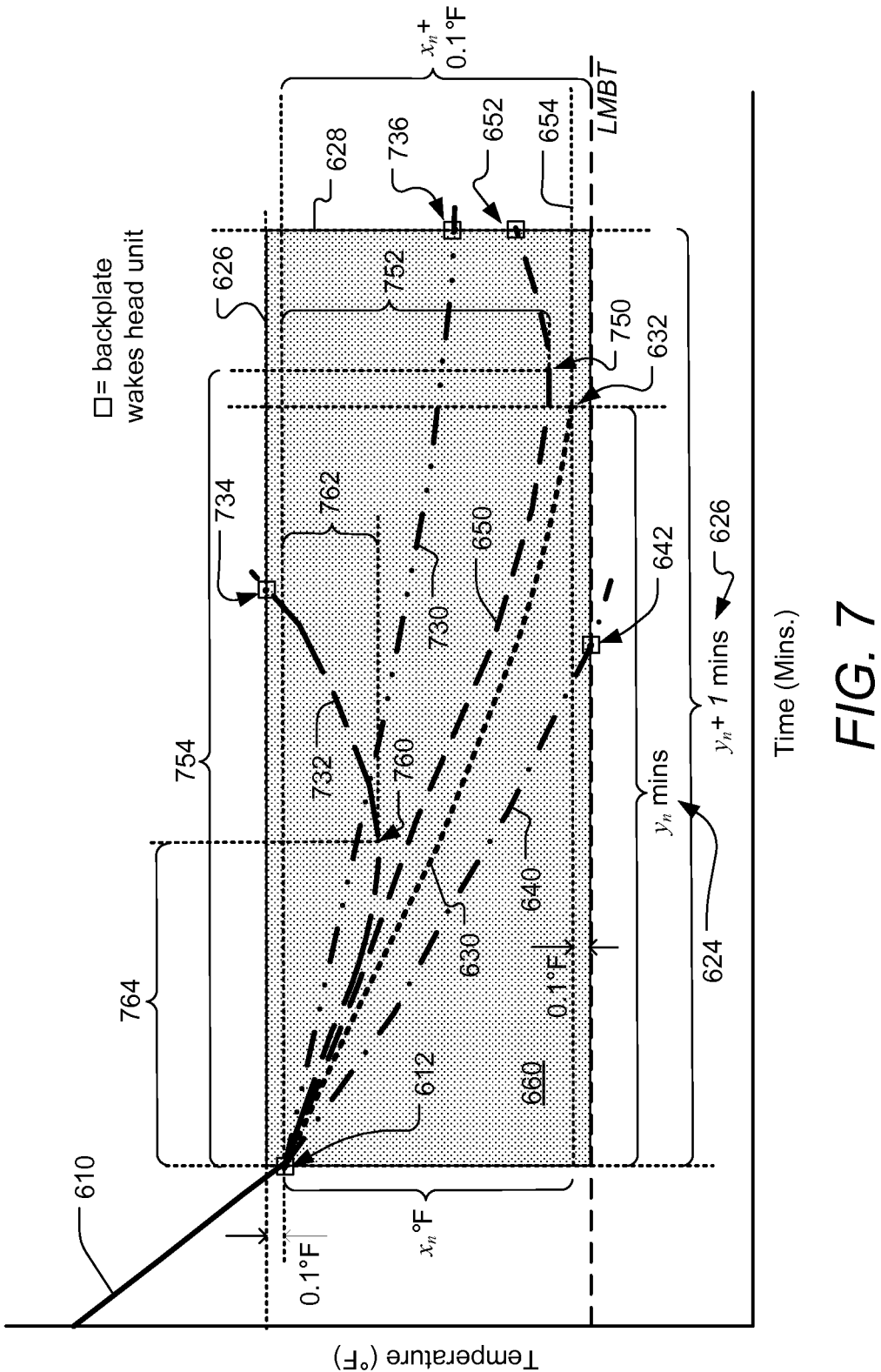
FIG. 7 is a diagram illustrating further detail of an adaptable fan cooling operation, according to some embodiments.

FIG. 7 is a diagram illustrating further detail of an adaptable fan cooling operation, according to some embodiments. The plot shown in FIG. 7 provides greater detail than that shown in FIG. 6, and also illustrates additional scenarios of fan cooling behavior. The expected fan cooling is plotted on line 630 in which the temperature is expected to be lowered by $x_n$ degrees in $y_n$ minutes. Also shown are the lines 640 and 650 for the scenarios described in FIG. 6. New lines 730 and 732 are also shown. In the scenario of line 730 the time limit for fan cooling $y_n$+60 seconds expires before the LMBT is reached. The case of line 730 differs from that of line 650 in that the minimum temperature was measured at the expiry of the time limit at point 736, whereas in the case of line 650 a minimum temperature point 750 is reached after which the temperature was rising. The scenario of the line 732 shows a case where the upper limit temperature for fan cooling 626 is reached prior to the expiry of the fan cooling time limit. In this case, as in the case of line 650, a minimum temperature is reached after which the temperature rose. Importantly, it has been found that in cases where a minimum temperature is reached, after which the temperature rises, such as the cases of lines 732 and 650, it is known precisely how much temperature drop fan cooling provided and how long it took to get there. In the case of line 732, the minimum point 760 shows that a temperature drop 762 was obtained which took time 764. In the case of line 650, the minimum point 750 shows that a temperature drop 752 was obtained which took time 754. According to some embodiments, the expected temperature drop and time for the next cooling cycle that uses fan cooling is set to the values determined using curves such as 650 and 732. For example, in the case of line 650, the next cooling cycle that uses fan cooling, the expected temperature drop $x_{n+1}$ is set to the actual temperature drop 652, and the expected time $y_{n+1}$ is set to time 754. In cases where a minimum is not detected, such as with lines 640 and 730, then an increment is made to either the expected temperature drop $x_{n+1}$ (in cases such as curve 640 where fan cooling occurred more quickly than expected) or to the expected time $y_{n+1}$ (in the cases such as curve 730 where fan cooling occurred more slowly than expected). Note that according to some embodiments, the backplate measures and logs the temperatures shown in FIG. 7 such that the head unit can later determine the values for setting future expected temperature drops $x_{n+1}$ and times $y_{n+1}$.

Figure 8:
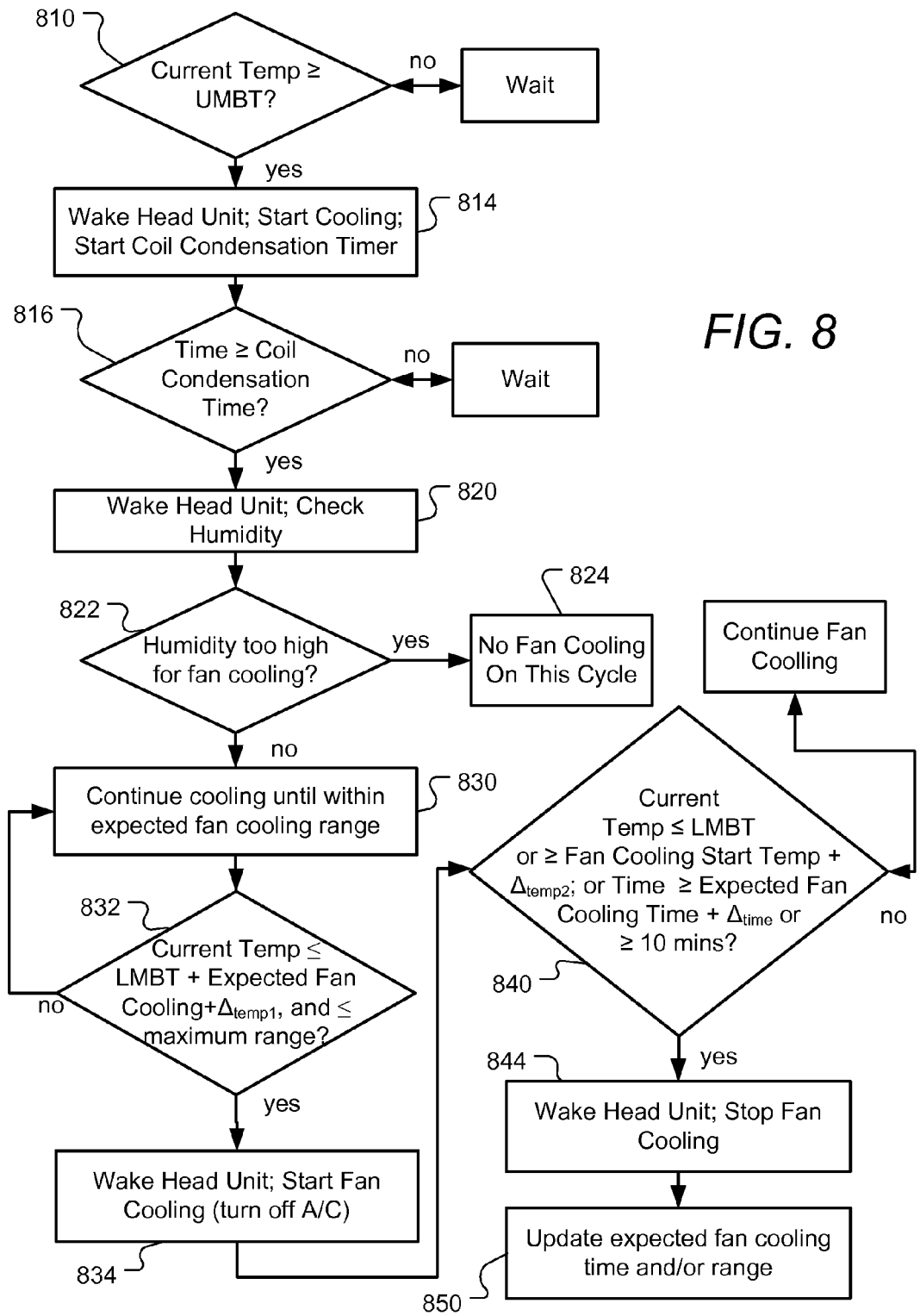
FIG. 8 is a flow chart showing aspects of an adaptable fan cooling operation, according to some embodiments.

FIG. 8 is a flow chart showing aspects of an adaptable fan cooling operation, according to some embodiments. In step 810 no cooling at all is provided until the temperature rises to the UMBT. Once the UMBT is reached, then in step 814 the backplate wakes the head unit. Normal AC cooling is started and the coil condensation timer is also started. If the timer has not expired then sufficient condensation has not yet collected on the AC evaporator coil and therefore no fan cooling takes place (since fan cooling is due to evaporative cooling). In step 816 if the timer expires then in step 820 the backplate wakes the head unit and the humidity check is carried out using a simple threshold or other methods as described with respect to FIG. 6. In step 822, if the humidity is too high then in step 824 fan cooling is not performed on the current cooling cycle. If the humidity check passes then in step 830 normal AC cooling continues. In step 832, the normal cooling continues until the current temperature falls to a point at which it can be expected that fan cooling alone will provide a temperature drop to the LMBT (unless the normal AC cooling brings the temperature below the LMBT in less than the timer period). According to some embodiments a small increment $\Delta_{temp1}$ is added to the expected temperature drop so as to provide fan cooling in certain cases where a previous cycle caused the expected fan cooling temperature drop to be zero. It has been found that 0.1° F. is a suitable value for $\Delta_{temp1}$. According to some embodiments, a maximum fan cooling range is also implemented. For example a maximum fan cooling range of 1° F. is found to be suitable in many situations. Where a maximum range is used fan cooling will also not begin unless the current temperature is within that maximum (e.g. 1° F.) above the LMBT. When either the maximum range or expected drop plus $\Delta_{temp1}$, above the LMBT is reached, then in step 834 the backplate wakes the head unit which starts fan cooling by turning off the AC compressor while leaving (or turning) on the fan motor. In step 840 the backplate measures and logs the temperature, and fan cooling continues until: (1) the temperature reaches the LMBT; (2) the temperature rises above an upper limit (=fan cooling start temp+a small fixed value); (3) the fan cooling time limit expires (=expected fan cooling time+a fixed value, $\Delta_{temp2}$) or (4) the fan cooling reaches a maximum time limit (e.g. 10 minutes). In one example, it has been found that 0.1° F. is a suitable value for $\Delta_{temp2}$ such that fan cooling stops if the current temperature either drops below LMBT, or if the current temperature rises more than 0.1° F. above the fan cooling starting temperature. When at least one of the four conditions is met then in step 844 the backplate wakes the head unit and fan cooling is ceased. In step 850 the expected values for fan cooling temperature drop and fan cooling time are updated based on the logged temperatures.

Figure 9:
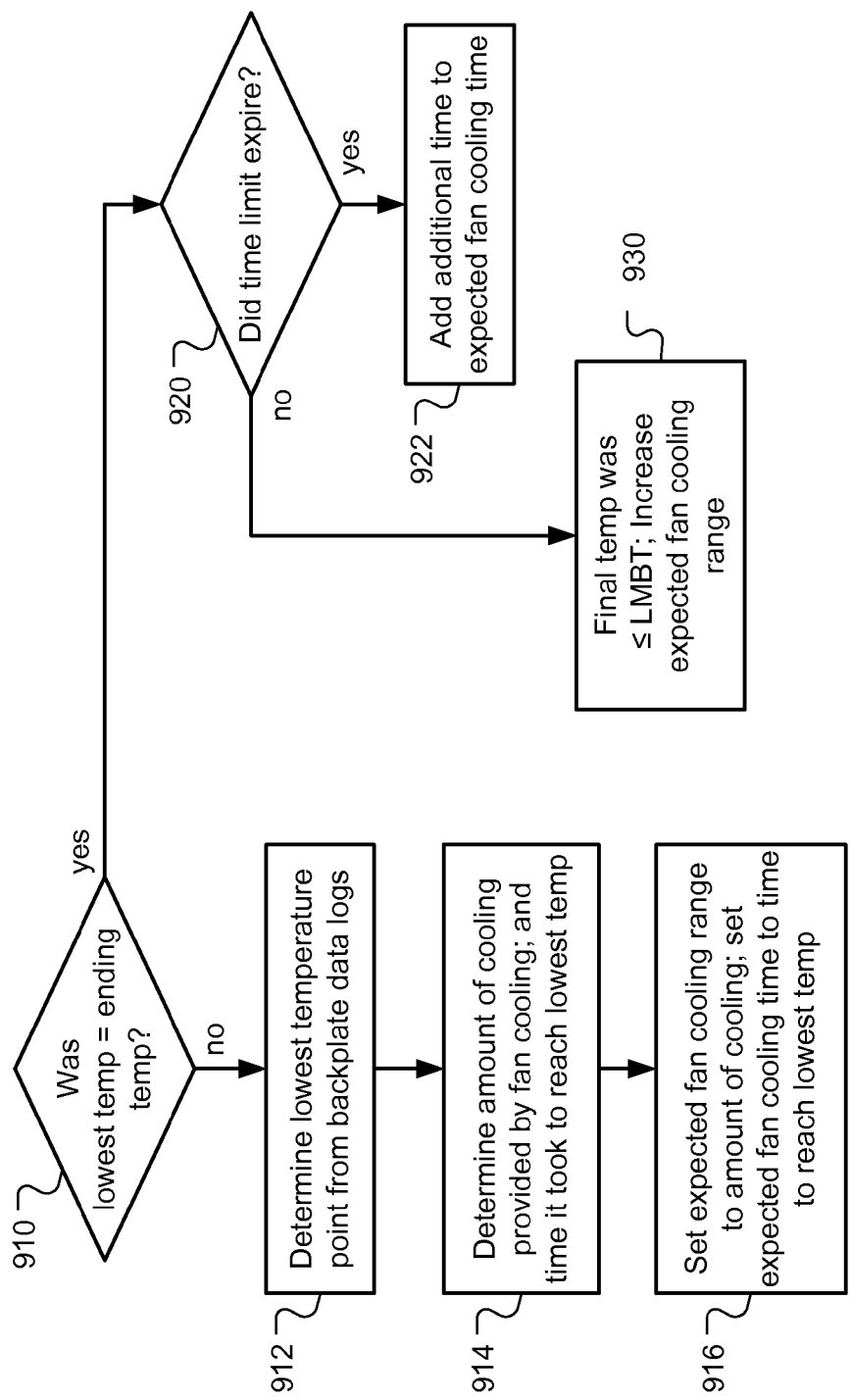
FIG. 9 is a flow chart showing further details of adapting fan cooling range and time, according to some embodiments.

FIG. 9 is a flow chart showing further details of adapting fan cooling range and time, according to some embodiments. In particular, the method shown can be used to update the expected fan cooling temperature drop and time based on data logged on the most recent cooling cycle that used fan cooling. In step 910, if the lowest temperature is not equal to the ending temperature then a temperature inflection point should have been detected. In such cases, in step 912 the lowest temperature point can be determined by the head unit from the backplate's temperature logs. In step 914, the amount of cooling and the time it took can both be determined. In step 916, the expected fan cooling temperature drop and time for the next cooling cycle to use fan cooling is set to the values determined in step 914. In case the lowest temperature was equal to the ending temperature, then no temperature inflection point can be determined. In step 920, if the time limit expired then fan cooling was still providing cooling when it ended. Therefore, in step 922, additional time is added to the time limit, i.e. $y_{n+1}=y_n+150$ secs. According to some embodiments, adding 60 seconds or longer is found to be suitable, since the cost of fan cooling is relatively low. If the time limit did not expire (and there was no inflection point) then in step 930 an additional amount is added to the expected temperature range of fan cooling. According to some embodiments, adding 0.25° F. was found to be suitable for many cases. Thus, $x_{n+1}=x_n+0.25°$ F. According to other embodiments, other incremental values for the time and temperature drop can be used. According to some embodiments the user through manual adjustment of the setpoint prematurely ends fan cooling (i.e. before the time expired or the temperature crosses a threshold). In such case the data is not considered reliable and it is not used for future predictions.

Figure 10:
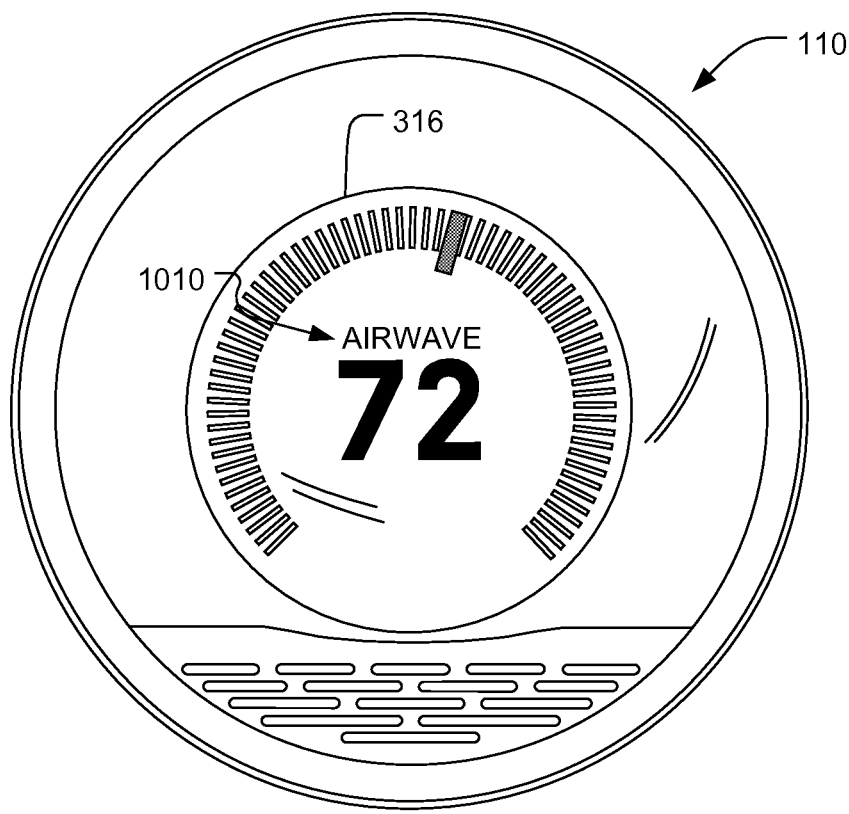
FIG. 10. shows a thermostat with a user interface informing users that a fan cooling operation is active, according to some embodiments.

FIG. 10. shows a thermostat with a user interface informing users that a fan cooling operation is active, according to some embodiments. Thermostat 110 is shown with a display 316. The display 316 includes a message 1010 that advises the user that the described fan cooling feature is activated, such as by the trade name AIRWAVE™. According to some embodiments, other forms of messaging can be used. For example, a ticker-tape style, or horizontally scrolling text message can be displayed moving across the screen 316 reading 'NEST IS EXTENDING YOUR FAN OPERATION TO SAVE YOU ENERGY' or the like.

While many embodiments have been described wherein the expected values for temperature drop due to fan cooling and time to achieve the drop are based on the most recent prior cooling cycle, other methods are envisaged. According to some embodiments, for example, the expected values can be based on an averaging of several (e.g. 2-5) prior cooling cycles. According to other embodiments, a weighted average can be used in which more recent cycles are more heavily favored. According to yet other embodiments, prior cycles can be used and/or weighted based on the similarity of conditions (such as indoor and outdoor temperature, humidity, weather, and solar radiation) between that cycle and the current conditions. According to yet other embodiments, data from other structures that are similar in environmental conditions and/or thermodynamic behavior can be used in adjusting fan cooling operation. Communication and/or calculations for such embodiments can be provided, for example, using cloud-based thermostat management system 506 via networks 502 and 504 as shown in FIG. 5.

Various modifications may be made without departing from the spirit and scope of the invention. Accordingly, the invention is not limited to the above-described embodiments, but instead is defined by the appended claims in light of their full scope of equivalents.

What is claimed is:

1. A method for cooling an enclosure comprising:
   initiating a first phase of a first cooling cycle in the enclosure using an air conditioning system having a compressor, an evaporator coil and a fan adapted to pass air over the evaporator coil, the first phase including activation of the compressor and the fan;
   subsequent to the first phase, initiating a second phase of the first cooling cycle wherein the fan is activated and the compressor is not activated;
   measuring of one or more parameters during at least the second phase of the first cooling cycle; and
   altering a duration of a second phase of a subsequent cooling cycle based at least in part on the measurements during the first cooling cycle, wherein the duration of the second phase of the subsequent cooling cycle depends on an expected temperature drop that is based at least in part on a measured temperature drop during the second phase of the first cooling cycle.

2. A method according to claim 1 wherein the initiating of the first and second phases being controlled by a thermostat, and the altering and measuring being carried out by the thermostat.

3. A method according to claim 2 wherein the thermostat includes high-power consuming circuitry adapted to perform a plurality of high-power consuming activities, and low power consuming circuitry adapted to perform a plurality of low power activities, wherein the high power circuitry is allowed to enter an inactive state to conserve power within the thermostat while the lower power circuitry measures and records one or more parameters.

4. A method according to claim 2 further comprising during the second phase of the first and subsequent cooling cycles, displaying on the thermostat a message advising a user a fan cooling operation is active.

5. A method according to claim 1 wherein the one or more measured parameters includes temperature.

6. A method according to claim 1 further comprising maintaining temperature within the enclosure using the air conditioning system between an upper maintenance band temperature and a lower maintenance band temperature, wherein the second phase of the subsequent cooling cycle is initiated when the expected temperature drop is expected to cool the enclosure to about the lower maintenance band temperature.

7. A method according to claim 6 wherein the second phase of the subsequent cooling cycle is initiated when a measured temperature is equal to or less than a combination of the expected temperature drop, the lower maintenance band temperature and a predetermined value.

8. A method according to claim 1 wherein the duration of the second phase of the subsequent cooling cycle further depends on an expected amount of time for the expected temperature drop, the expected amount of time being based at least in part on an amount of time associated with the temperature drop during the second phase of the first cooling cycle.

9. A method according to claim 1 further comprising ceasing the second phase of the subsequent cooling cycle based on a measured temperature being above an upper limit, below a lower limit, or an elapsed time exceeding the expected duration by a predetermined amount.

10. A method according to claim 1 wherein the initiation of the second phase of the first cooling cycle depends at least in part on an elapsed time for the first phase of the first cooling cycle exceeding a predetermined time limit.

11. A method according to claim 10 wherein the predetermined time limit is sufficient so as to allow condensation to form on the evaporator coil during the first phase of the first cooling cycle.

12. A method according to claim 1 wherein the initiation of the second phase of the first cooling cycle depends at least in part on a humidity measurement within the enclosure.

13. A method according to claim 12 wherein the second phase of the first cooling cycle is not initiated when a relative humidity exceeds a predetermined threshold.

14. A method according to claim 13 wherein the predetermined threshold is between 45 and 60 percent relative humidity.

15. A thermostat adapted and programmed to cool an enclosure using a method according to claim 1.

16. A thermostat for controlling cooling of an enclosure, the thermostat comprising:
one or more temperature sensors; and
one or more processors in communication with the one or more temperature sensors, the one or more processors configured to:
initiate a first phase of a first cooling cycle in the enclosure using an air conditioning system having a compressor, an evaporator coil and a fan adapted to pass air over the evaporator coil, the first phase including activation of the compressor and the fan;
initiate a second phase of the first cooling cycle subsequent to the first phase wherein the fan is activated and the compressor is not activated;
measure, using the one or more temperature sensors, of one or more parameters during at least the second phase of the first cooling cycle; and
alter a duration of a second phase of a subsequent cooling cycle based at least in part on the measurements during the first cooling cycle, wherein the duration of the second phase of the subsequent cooling cycle depends on an expected temperature drop that is based at least in part on a measured temperature drop during the second phase of the first cooling cycle.

17. A thermostat according to claim 16, wherein the one or more processors are configured such that the duration of the second phase of the subsequent cooling cycle further depends on an expected amount of time for the expected temperature drop, the expected amount of time being based at least in part on an amount of time associated with the temperature drop during the second phase of the first cooling cycle.

18. A thermostat according to claim 16, wherein the one or more processors are configured to cease the second phase of the subsequent cooling cycle based on a measured temperature being above an upper limit, below a lower limit, or an elapsed time exceeding the expected duration by a predetermined amount.

19. A thermostat according to claim 16, wherein the one or more processors are configured such that the initiation of the second phase of the first cooling cycle depends at least in part on an elapsed time for the first phase of the first cooling cycle exceeding a predetermined time limit.

\* \* \* \* \*